United States Patent
Schneider et al.

[19]

[11] Patent Number: 6,142,012

[45] Date of Patent: Nov. 7, 2000

[54] METHOD OF DIAGNOSING A CATALYTIC CONVERTER AND ARRANGEMENT THEREFOR

[75] Inventors: Erich Schneider, Kirchheim; Klaus Ries-Müller, Bad Rappenau, both of Germany

[73] Assignee: Robert Bosch GmbH, Stuttgart, Germany

[21] Appl. No.: 09/234,116

[22] Filed: Jan. 19, 1999

[30] Foreign Application Priority Data

Jan. 17, 1998 [DE] Germany .................. 198 01 629

[51] Int. Cl.⁷ .................................................. G01M 15/00
[52] U.S. Cl. ............................................................ 73/118.1
[58] Field of Search ............................... 73/116, 117.2, 73/117.3, 118.1

[56] References Cited

U.S. PATENT DOCUMENTS

| | | |
|---|---|---|
| 3,969,932 | 7/1976 | Rieger et al. . |
| 5,763,771 | 6/1998 | Ott et al. ........................... 73/117.3 |
| 5,797,375 | 8/1998 | Kratt ................................. 73/119 A |
| 5,822,710 | 10/1998 | Mezger et al. ........................ 116/116 |
| 5,861,553 | 1/1999 | Janetzke et al. .................. 73/117.3 |
| 5,862,507 | 1/1999 | Wu et al. . |
| 5,974,790 | 11/1999 | Adamczyk et al. . |
| 5,991,684 | 11/1999 | Fukuchi et al. ....................... 73/116 |

*Primary Examiner*—Eric S. McCall
*Attorney, Agent, or Firm*—Walter Ottesen

[57] ABSTRACT

The invention is directed to a method of diagnosing a catalytic converter mounted in the exhaust-gas system of an internal combustion engine. An exhaust-gas probe is mounted rearward of the catalytic converter and at least one misfire of a combustion of the engine is stimulated. The reaction of the exhaust-gas probe to the stimulation of the misfire is evaluated to diagnose the catalytic converter. The invention is also directed to an arrangement for diagnosing a catalytic converter.

9 Claims, 3 Drawing Sheets

METHOD OF DIAGNOSING A CATALYTIC CONVERTER AND ARRANGEMENT THEREFOR

FIELD OF THE INVENTION

The invention relates to the diagnosis of catalytic converters that are used to convert toxic substances in the exhaust gas of internal combustion engines.

BACKGROUND OF THE INVENTION

The conversion capability of catalytic converters of this kind is dependent upon deterioration and can be damaged because of a malfunction of the engine and because of erroneous use by the driver of a motor vehicle. Statutory requirements provide for an on-board diagnosis of the motor vehicle components which are relevant to the emission of toxic substances, such as catalytic converters. U.S. Pat. No. 3,969,932 discloses a diagnosis of a catalytic converter which is based on the evaluation of the phase shift between the signals of an oxygen probe mounted forward of the catalytic converter and an oxygen probe mounted rearward thereof.

The known diagnosis utilizes the relationship of the oxygen storage capability of the catalytic converter with its conversion capability. For this purpose, an operation of the engine first takes place with an oxygen deficiency caused by a fuel enrichment of the mixture of fuel and inducted air which is to be combusted in the engine. Oxygen, which is possibly stored in the catalytic converter, reacts with the excessive fuel so that, after a certain time, a catalytic converter is present which has been definitively emptied of oxygen. Correspondingly, the exhaust-gas probes, which are mounted forward and rearward of the catalytic converter, signalize an oxygen deficiency. Thereafter, the engine is operated with an oxygen enriched mixture. The oxygen excess resulting therefrom in the exhaust gas is first stored in the catalytic converter so that, at first, an oxygen deficiency continues to be present rearward of the catalytic converter. This changes only after the oxygen storage capability of the catalytic converter is exhausted. The probe, which is mounted rearward of the catalytic converter, therefore reacts with a delay to the change of the oxygen content of the exhaust gas. The extent of the delay, which becomes manifest as a phase shift between the signals of the two probes, reflects the storage capacity and therefore the converting capability of the catalytic converter.

It has been shown that phase shifts of typically 200 ms occur which are burdened with a measuring inaccuracy of approximately 30 ms. The measuring uncertainty is caused, for example, by temperature influences. The phase shift to be expected increases with increasing size of the catalytic converter. For this reason, the measurement uncertainty remains essentially constant and the known diagnosis is that much better the larger the catalytic converter to be evaluated. For smaller catalytic converters, for example, precatalytic converters, for vehicles having forward and main catalytic converters, the known diagnosis is therefore only suitable to a certain extent.

SUMMARY OF THE INVENTION

It is an object of the invention to provide a diagnosis for a catalytic converter which supplies reliable results also for small catalytic converters (precatalytic converter and main catalytic converter).

The method of the invention is for diagnosing a catalytic converter mounted in the exhaust-gas system of an internal combustion engine. The method includes the steps of: providing an exhaust-gas probe and mounting the exhaust-gas probe rearward of the catalytic converter; stimulating at least one misfire of a combustion of the engine; and, evaluating the reaction of the exhaust-gas probe to the stimulation of the misfire to diagnose the catalytic converter.

The essence of the invention lies in the stimulation of combustion misfires to generate defined conditions for the diagnosis of the catalytic converter. The stimulation of injection suppressions (that is, the one or several non-actuations of individual injection valves of the engine) effects the situation that a defined and essentially known air quantity is available forward of the catalytic converter. If, for example, an individual injection for a cylinder is suppressed, then this cylinder pumps an air quantity which corresponds approximately to the piston displacement of the engine divided by the number of its cylinders. This air quantity defines to a certain extent the index unit which determines the resolving capacity of the diagnosis. Advantageously, the oxygen storage capacity of a limit catalytic converter can define the basis of the diagnosis. This limit catalytic converter is defined by a conversion capability which marks the limit between a catalytic converter which is still good and one that is already poor. A limit catalytic converter of this kind for precatalytic converter applications typically has an oxygen storage capability which corresponds to an air-storage capability of approximately 100 mg. This quantity of air lies in the order of magnitude of that air magnitude which can be generated by the suppression of an individual injection. The subject matter of the invention is therefore advantageously suited for the diagnosis of smaller catalytic converters.

A further advantage is seen in that the test air quantity, which is generated by suppressions of injection, can be varied in fine steps by varying the number of injections suppressions. Here, the air quantity equivalent to an individual fuel injection defines to a certain extent the quantization stepwidth with which the method of the invention can distinguish good catalytic converters from poor ones. In contrast to the above-mentioned evaluation of the phase shift, no reaction of the exhaust-gas probe rearward of the catalytic converter occurs for a good catalytic converter for the subject matter of the invention. In this way, an exhaust-gas deterioration is advantageously avoided as a consequence of the overloading of the catalytic converter.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
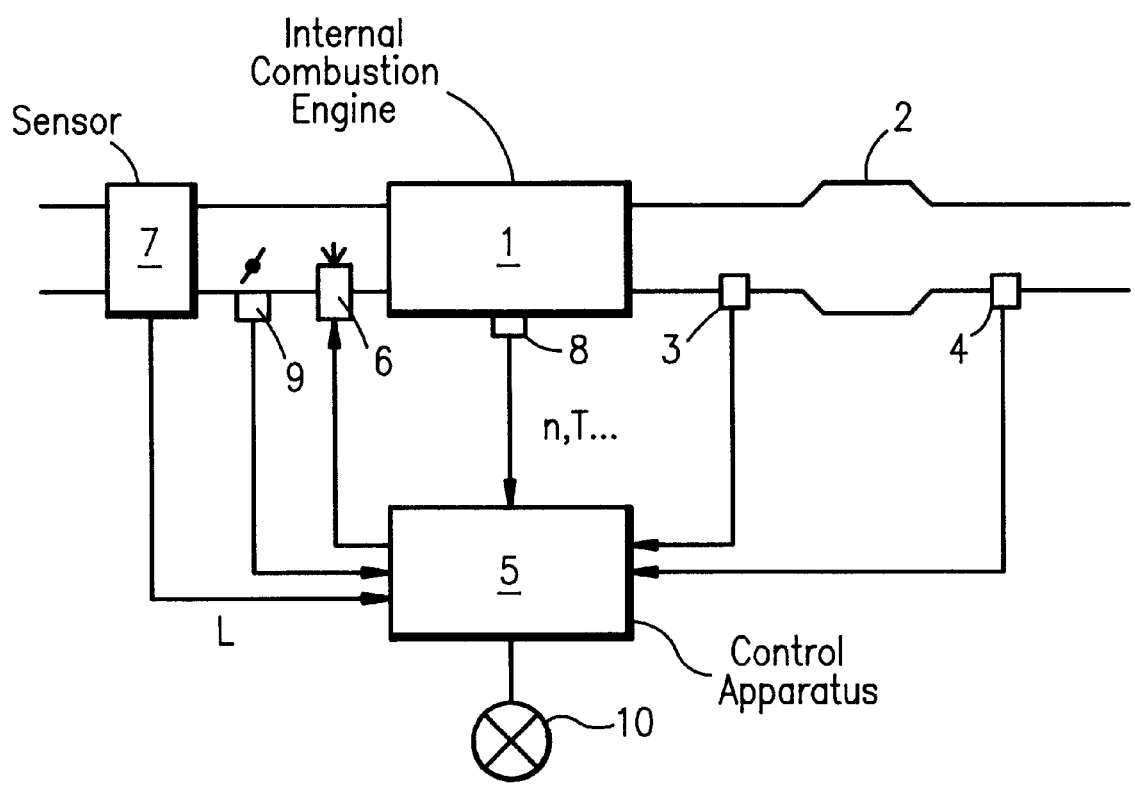
FIG. 1 shows the technical background in which the invention is effective.

FIG. 1 shows an internal combustion engine 1 including a catalytic converter 2, exhaust-gas probes 3 and 4, a control apparatus 5, a fuel-metering device 6 and different sensors (7, 8, 9) for load L, rpm (n) as well as further operating parameters of the engine, as required, such as temperatures, throttle flap position, et cetera. A fault lamp 10 serves as means indicating a determined malfunction.

From the above-mentioned input signals and, if required, further signals, the control apparatus forms, inter alia, fuel-metering signals with which the fuel-metering device 6 is driven. The fuel-metering device 6 can be configured for a so-called manifold injection as well as for a gasoline direct injection into the combustion chambers of the individual cylinders. The method of the invention concerns, in this environment, primarily the control apparatus 5, the fuel-metering device 6 and the exhaust-gas probe 4, which is mounted rearward of the catalytic converter, as well as the means 10 for indicating a malfunction.

Figure 2A:
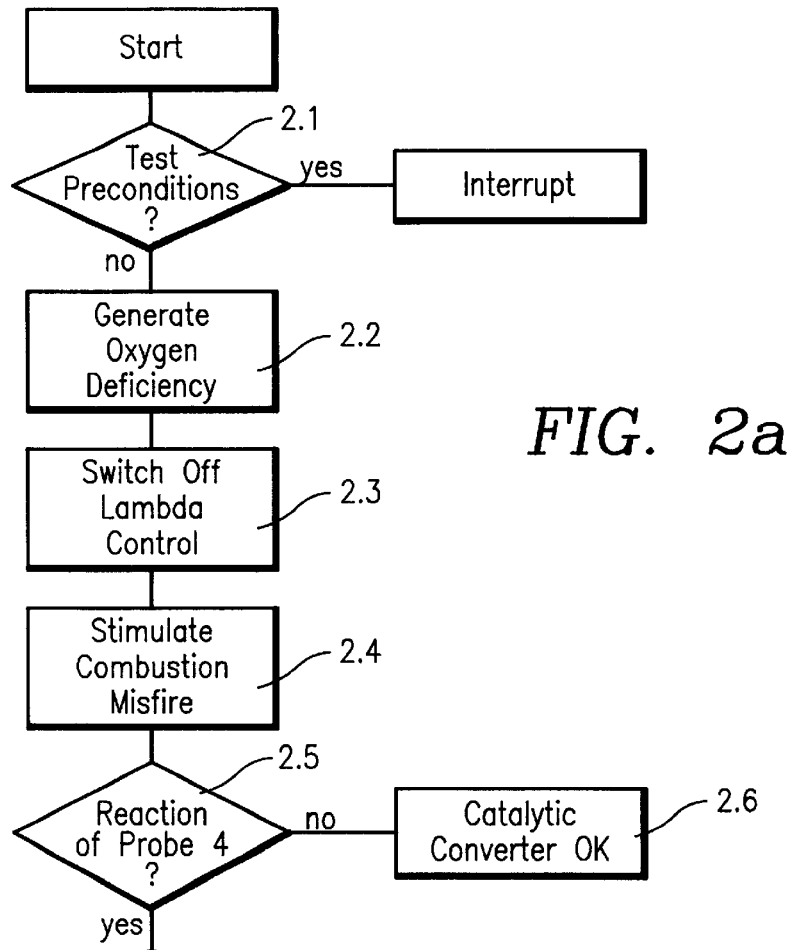
FIGS. 2a and 2b show an embodiment of the method of the invention.
Figure 2B:
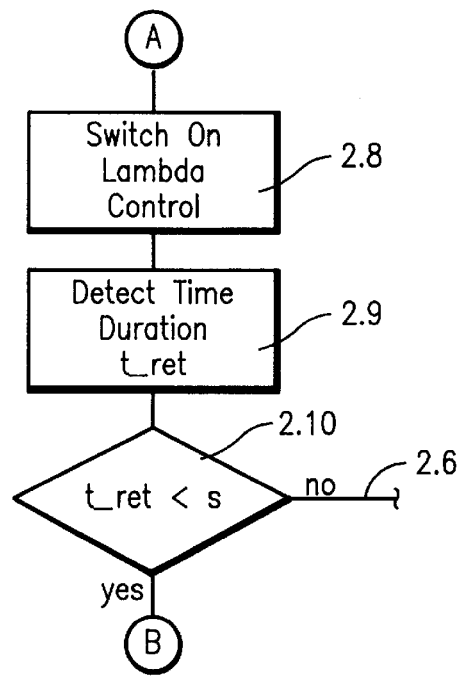

FIGS. 2*a* and 2*b* disclose an embodiment of the method of the invention as it is processed by the control apparatus 5.

Step 2.1 checks as to suitable preconditions for a catalytic converter diagnosis. The defined operating state, which is assigned to the execution of the diagnostic procedure, is advantageously steady state and is characterized by an adequate catalytic converter temperature and, furthermore includes the presence of an oxygen deficiency rearward of the catalytic converter as an additional condition. Steady-state operating conditions are characterized by approximately constant operating parameters, especially load and rpm of the engine.

The catalytic converter temperature can be measured or can be modeled in the control apparatus 5 from the other operating parameters. The oxygen deficiency rearward of the catalytic converter is advantageously detected with the exhaust-gas probe mounted rearward of the catalytic converter. Conventionally, the engine is operated with an air/fuel ratio control (lambda control) which is based on the signal of the exhaust-gas probe 3 mounted forward of the catalytic converter. Here, the exhaust-gas probe 4 mounted rearward of the catalytic converter commands the lambda control such that the rearward exhaust-gas probe 4 signalizes a slight oxygen deficiency under normal conditions which corresponds to a slightly rich air/fuel mixture composition.

If the oxygen deficiency is not present, then this oxygen deficiency is generated in step 2.2. For this purpose, a temporary enrichment of the mixture is suitable. If, in contrast, the oxygen deficiency is already present, then the execution of step 2.2 is not necessary. Nonetheless, step 2.2 improves and completes the emptying of the catalytic converter from the stored oxygen and thereby improves the reproducibility of the diagnostic results.

In the ideal case, the catalytic converter no longer holds stored oxygen before the misfire stimulation. Step 2.3 switches the lambda control off. This step too is not perforce necessary. A switching off of the lambda control prevents an enrichment of the lambda control as a reaction to the oxygen excess in the exhaust gas which is caused temporarily by the misfire. In step 2.4, combustion misfires are stimulated via a temporary switchoff of the fuel metering to one or more cylinders. The number of injection suppressions is determined in accordance with the catalytic converter volume, the piston displacement of the engine, its number of cylinders, and the instantaneous air charge of the cylinders. The last item is known in the control apparatus from the usual determination of the injection pulsewidths from load and rpm of the engine.

In step 2.5, it is determined whether the oxygen quantity, which has reached the exhaust gas via at least one stimulated misfire, already causes a reaction of the probe rearward of the catalytic converter. The number of misfires is advantageously so determined that a catalytic converter which is just still acceptable (that is, a catalytic converter which, for example, just satisfies the exhaust-gas standards) can still take up the above-mentioned oxygen quantity. If no probe reaction occurs with the test, then the catalytic converter is at least as good as the limit catalytic converter which marks the boundary between good and poor catalytic converters. In this case, the inquiry of step 2.5 is answered in the negative and an item of information can be stored in step 2.6 which states that the catalytic converter is in good order. However, if, in step 2.5, a probe reaction occurs, then the catalytic converter is already poorer than the limit catalytic converter. In this case, a display or storage of a fault announcement takes place in step 2.7. The fault announcement can be displayed directly via the fault lamp or can be stored first in order to increase the reliability of the diagnostic statement and only be displayed after a repeated occurrence.

The variation of FIG. 2*b* can be inserted between the steps 2.5 and 2.7 and serves to increase the diagnostic reliability. The difference with respect to the above-described embodiment results essentially from steps 2.9 and 2.10. Accordingly, in step 2.9, after the occurrence of a probe reaction (oxygen excess indication) a wait is had until the probe signal again returns to its normal operating region (oxygen deficiency indication) and time duration t_ret, which is required for the return, is detected. This time is likewise an index for the oxygen storage capability. This time is, to a certain extent, needed for emptying the catalytic converter of oxygen and therefore increases with increasing oxygen storage capability of the catalytic converter. In step 2.10, a comparison of this time to a threshold value takes place which corresponds to the oxygen storage capability which a limit catalytic converter exhibits. If the threshold value is not reached, then the catalytic converter is deemed to be defective and the output or storage of a fault announcement takes place in step 2.7. Step 2.8 switches the lambda control on again when this control had been switched off previously in step 2.3.

Figure 3A:
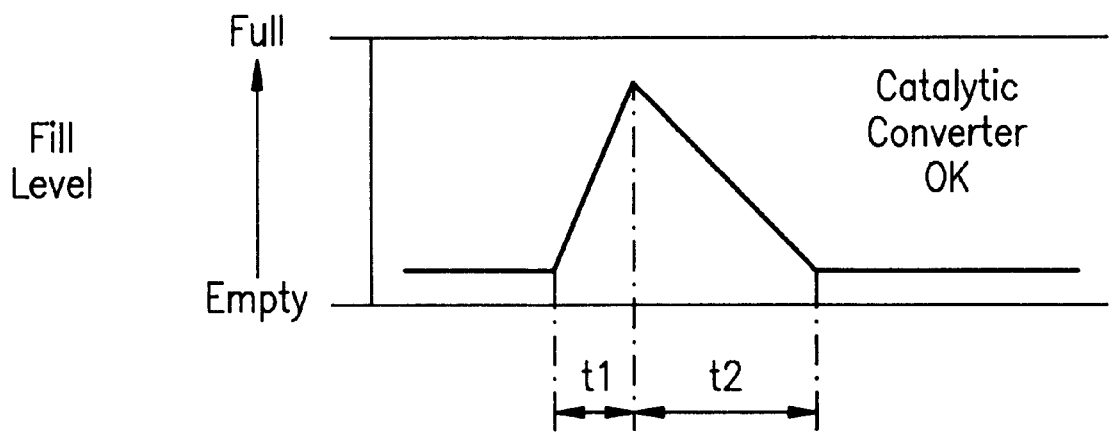
FIG. 3 presents the invention in the context of a graphic presentation of the degree of charge of oxygen of different catalytic converters in carrying out the method of the invention.
Figure 3B:
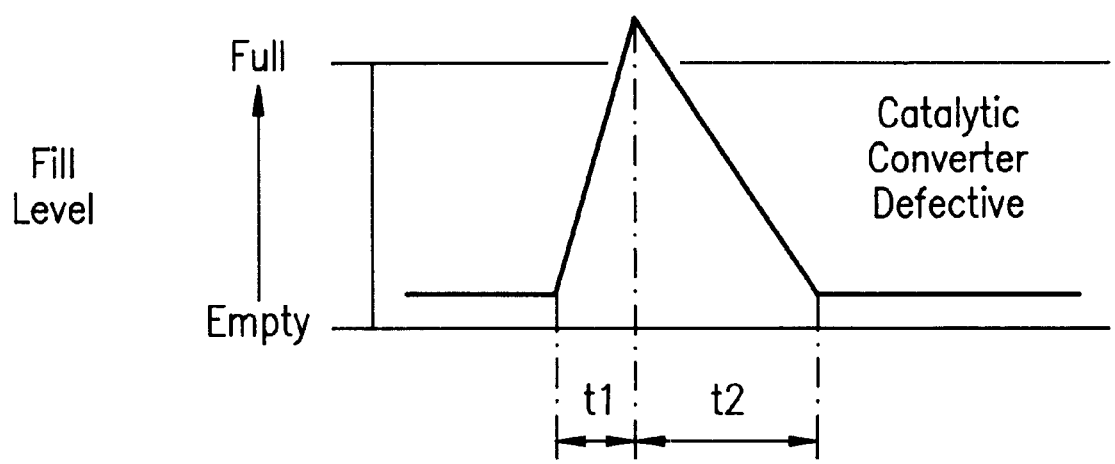

FIGS. 3*a* and 3*b* show the invention in the context of the catalytic converter fill level plotted as a function of time when carrying out the method of the invention. FIG. 3*a* corresponds to the conditions for a good catalytic converter. This catalytic converter is empty at the start of the test and therefore no longer contains oxygen which is a condition precedent for the oxygen deficiency rearward of the catalytic converter. At time point t1, one or more injection misfires are triggered. This corresponds to a filling of the catalytic converter with a defined quantity of oxygen. In the case of FIG. 3*a*, the fill upper limit, which is marked by the upper solid line identified by the term "full", is not reached. The storage capability of this catalytic converter is not exhausted by the defined oxygen quantity appropriate for a limit catalytic converter.

Different conditions are present for the catalytic converter which forms the basis of FIG. 3*b*. Here, the upper solid line is exceeded, which would become evident in an oxygen excess in the exhaust gas rearward of the catalytic converter and would be registered by the rearward exhaust-gas probe. The oxygen storage capability of this catalytic converter is no longer adequate to store the defined oxygen quantity adapted to the limit catalytic converter. Accordingly, this catalytic converter would be evaluated as being defective in the application of the invention.

It is understood that the foregoing description is that of the preferred embodiments of the invention and that various changes and modifications may be made thereto without departing from the spirit and scope of the invention as defined in the appended claims.

What is claimed is:

1. A method of diagnosing a catalytic converter of an internal combustion engine having an exhaust-gas system and the catalytic converter being mounted in the exhaust-gas system, the method comprising the steps of:

providing an exhaust-gas probe and mounting said exhaust-gas probe rearward of said catalytic converter;

actively stimulating at least one misfire of a combustion of said engine; and, evaluating the reaction of said exhaust-gas probe to the active stimulation of said misfire to diagnose said catalytic converter.

2. The method of claim 1, wherein fuel is metered to the engine, the method comprising the further step of stimulating said misfire by temporarily switching off the metering of fuel to at least one cylinder of said engine.

3. The method of claim 2, wherein there is an occurrence of predetermined conditions, the method comprising the further step of carrying out said stimulation only upon the occurrence of predetermined conditions which include a defined operating state of said catalytic converter.

4. The method of claim 3, wherein said defined operating state is characterized by said exhaust-gas probe outputting a signal indicative of a rich mixture composition of said engine.

5. The method of claim 1, wherein said exhaust-gas probe outputs a signal and said catalytic converter has a storage capacity; and, wherein said method further comprises the steps of:

actively stimulating a number of misfires sufficient that a quantity of air pumped into said exhaust gas corresponds to an oxygen quantity which corresponds to the oxygen storage capacity of a catalytic converter which defines a boundary between a catalytic converter which is operating properly and a catalytic converter which is not operating properly; and, outputting a fault signal and/or storing a fault when said signal of said exhaust-gas probe moves out of a pregiven bandwidth.

6. The method of claim 2, wherein said engine includes a lambda control; and, wherein said method includes the further step of temporarily switching off said lambda control after the metering of fuel is switched off.

7. The method of claim 5, wherein said exhaust-gas probe has a conventional operating region lying outside of said pregiven bandwidth, the method comprising the further step of outputting said fault signal or storing said fault when said signal of said exhaust-gas probe again returns to said conventional operating region lying outside of said pregiven bandwidth.

8. An arrangement for diagnosing a catalytic converter of an internal combustion engine which generates exhaust gas having a flow direction through said catalytic converter, said arrangement comprising:

means for actively stimulating at least one misfire of a combustion in said engine;

an exhaust-gas probe mounted rearward of said catalytic converter in the flow direction of the exhaust gas; and, means for evaluating a reaction of said exhaust-gas probe to the active misfire stimulation for diagnosing said catalytic converter.

9. The arrangement of claim 8, said evaluating means functioning to output or store a fault signal.

* * * * *